(12) United States Patent
Losey

(10) Patent No.: US 6,631,637 B2
(45) Date of Patent: Oct. 14, 2003

(54) SENSOR MOUNTING ASSEMBLY FOR A VEHICLE TIRE

(75) Inventor: Allan Losey, Ortonville, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/075,160

(22) Filed: Feb. 14, 2002

(65) Prior Publication Data

US 2002/0148286 A1 Oct. 17, 2002

Related U.S. Application Data

(60) Provisional application No. 60/283,555, filed on Apr. 12, 2001.

(51) Int. Cl.[7] .............................................. G01M 17/02
(52) U.S. Cl. ............................................................ 73/146
(58) Field of Search ................................. 73/146, 146.5, 73/146.8, 146.4; 340/447

(56) References Cited

U.S. PATENT DOCUMENTS

| | | | |
|---|---|---|---|
| 4,235,184 A | * 11/1980 | Schiavone | 116/34 R |
| 5,513,525 A | 5/1996 | Schurmann | |
| 5,541,574 A | 7/1996 | Lowe et al. | |
| 5,717,135 A | 2/1998 | Fiorletta et al. | |
| 5,781,104 A | 7/1998 | Huang | |
| 5,798,689 A | * 8/1998 | Huang | 340/447 |
| 5,844,131 A | 12/1998 | Gabelmann et al. | |
| 6,055,855 A | 5/2000 | Straub | |
| 6,124,787 A | 9/2000 | Isakov et al. | |

FOREIGN PATENT DOCUMENTS

| | | |
|---|---|---|
| DE | 3905190 | 5/1990 |
| DE | 3915996 | 6/1990 |
| FR | 2574508 | 12/1984 |
| JP | 5714402 | 7/1982 |

* cited by examiner

Primary Examiner—Edward Lefkowitz
Assistant Examiner—Jermaine Jenkins

(57) ABSTRACT

A vehicle wheel sensor assembly (22) includes a pressure sensor (24) and a counterweight (26) mounted to a band (28). The band (28) is of a length to extend around the inner diameter of the wheel rim (12) such that the pressure sensor (24) is mounted 180 degrees opposite the counterweight (26) when installed around the inner diameter. The sensor (24) and the counterweight (26) thereby minimally effects the balance of the vehicle wheel assembly (10). The band (28) includes a male end (32) which fits into a female end (34) in a zip-tie like manner. An antenna (36) is mounted along the length of the band (28) for a length approximately equal to the rim (12) inner diameter such that heretofore transmission/reception problems are essentially eliminated.

19 Claims, 1 Drawing Sheet

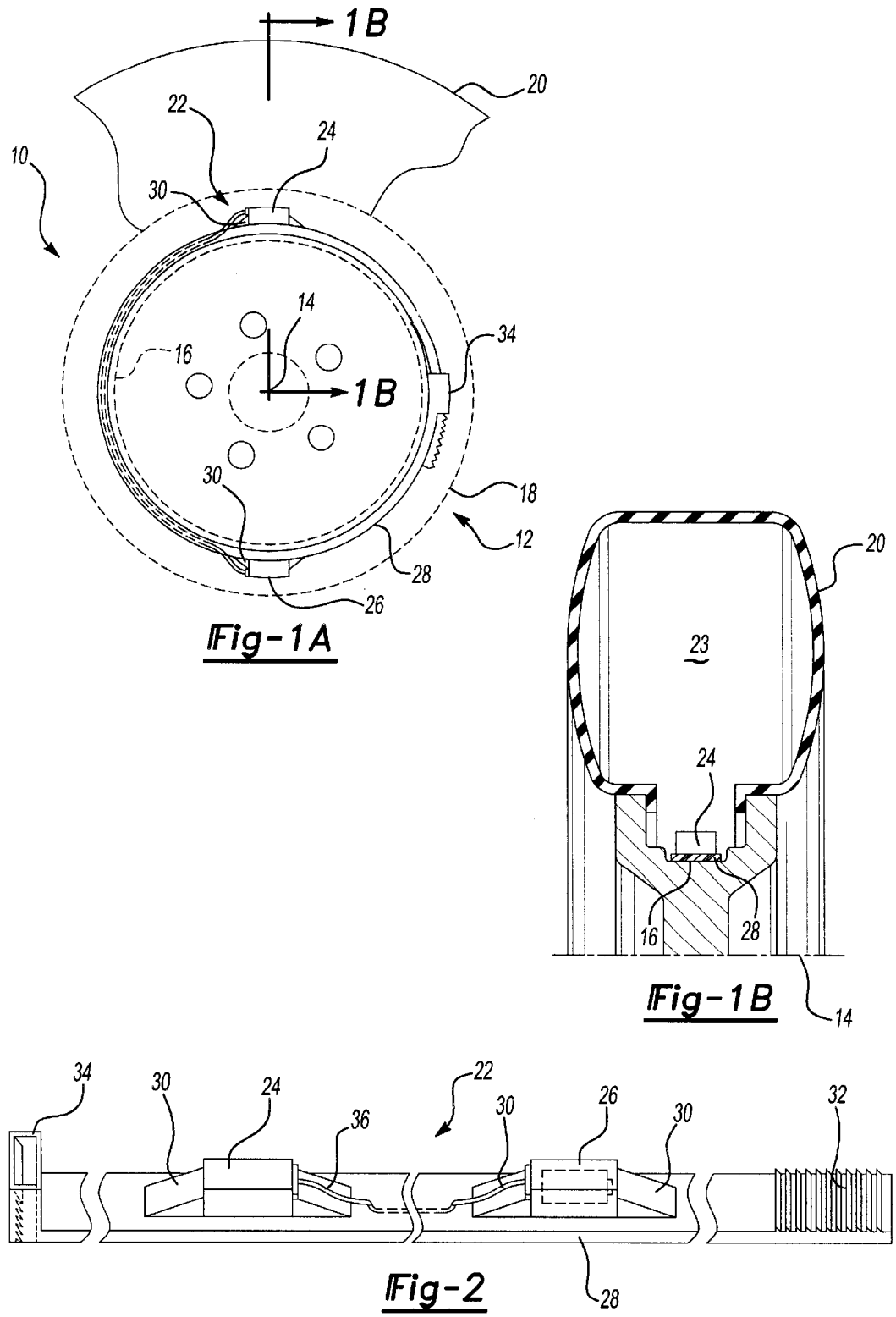

SENSOR MOUNTING ASSEMBLY FOR A VEHICLE TIRE

BACKGROUND OF THE INVENTION

The present application claims priority to U.S. Provisional Patent Application Serial No. 60/283,555, filed Apr. 12, 2001.

The present invention relates to a sensor within a vehicle tire, and more particularly to a mounting assembly for a pressure sensor within a vehicle tire.

Many vehicles have a multiple of tires which may deflate. Drivers of such vehicles may have difficulty detecting that a tire has a lower than desired pressure. Other vehicles include tire inflation systems in which the pressure within the tires is commonly displayed to the driver. Commonly, tire pressure sensors are incorporated into such vehicles.

One tire pressure sensor arrangement provides for mounting a sensor adjacent a tire valve stem. The sensor is mounted within the tire while the valve stem extends therefrom to the tire exterior. The valve stem may also be used as an antenna for the sensor.

Disadvantageously, the known sensor arrangement is difficult to adapt to multiple vehicle wheels as the tire stem typically exits the wheel rim at different angles. A particular sensor arrangement must therefore be matched to each wheel assembly. The sensor arrangement must also be disassembled whenever a new tire is mounted to the wheel rim which may increase the likelihood of sensor damage. Moreover, as the tire stem operates as an antenna, it must be manufactured of a metallic material which increases cost and is more susceptible to damage than conventional non-metallic stems.

Accordingly, it is desirable to provide an inexpensive and robust mounting arrangement for a tire pressure sensor arrangement.

SUMMARY OF THE INVENTION

The vehicle wheel assembly according to the present invention provides a sensor assembly mounted about the inner diameter of a vehicle wheel rim. The sensor assembly includes a pressure sensor and a counterweight mounted to a band. The band is of a length to extend around the inner diameter of the wheel rim such that the pressure sensor is mounted 180 degrees opposite the counterweight when installed around the inner diameter. The sensor and the counterweight thereby minimally effects the balance of the vehicle wheel assembly.

The band includes a male end which fits into a female end in a zip-tie like manner. Such a locking arrangement is particularly advantageous in a manufacturing environment in which inner diameters may vary from rim to rim. An antenna is mounted along the length of the band up to a length equal to the rim inner diameter such that heretofore transmission/reception problems are essentially eliminated.

The present invention therefore provides an inexpensive and robust mounting arrangement for a tire pressure sensor arrangement.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1A is a side partially phantom view of a vehicle wheel assembly;

FIG. 1B is a sectional view of the vehicle wheel assembly of FIG. 1A taken along the line 1B—1B; and FIG. 2 is a perspective view of a sensor assembly according to the present invention.

DETAILED DESCRIPTION OF THE PREFERRED EMBODIMENT

FIG. 1A illustrates a partial phantom view of a vehicle wheel assembly 10. The vehicle wheel assembly 10 includes a vehicle wheel rim 12 which rotates about a rotational axis 14. The vehicle wheel rim 12 defines an inner diameter 16 and an outer diameter 18 to which is mounted a pneumatic tire (illustrated schematically at 20).

A sensor assembly 22 is preferably mounted about the inner diameter 16 to measure a pressure within an interior 23 of the tire 20 (also illustrated in FIG. 1B). Measurement of a pressure within a tire is known. It should be understood that other sensors will also benefit from the present invention.

The sensor assembly 22 includes a pressure sensor 24 and a counterweight 26 mounted to a band 28. Preferably, the pressure sensor 24 and the counterweight 26 lock into the band at locking structures 30 (FIG. 2). The pressure sensor 24 and the counterweight 26 may alternatively or additionally be molded into the band 28.

The band 28 is of a length to extend around the inner diameter 16 of the wheel rim 12. Although the pressure sensor 24 and the counterweight 26 are illustrated as mounted on the band 28 on a side opposite the inner diameter 16 in the disclosed embodiment, it should be understood that the pressure sensor 24 and the counterweight 26 may alternatively be mounted between the band 28 and the inner diameter 16.

Preferably, the pressure sensor 24 and the counterweight 26 are located along a length (FIG. 2) of the band 28 such that the pressure sensor 24 is mounted 180 degrees opposite the counterweight 26 when installed around the inner diameter 16 (FIG. 1A). The sensor 24 and the counterweight thereby minimally effects the balance of the vehicle wheel assembly 10 about the rotational axis 14. A sensor power source is alternatively remotely located from the sensor to act as the counterweight. That is, the counterweight is a battery which powers the sensor.

Referring to FIG. 2, the sensor assembly 22 is illustrated. The band 28 is preferably manufactured of a non-metallic material having a male end 32 and female end 34. The male end 32 fits into the female end 34 in a zip-tie like manner. That is, the male end 32 passes through the female end 34 and cannot then be pulled back out. Such a locking arrangement is particularly advantageous in a manufacturing environment in which inner diameters may vary from rim to rim. It should be understood, however, that other bands including those with separate locking members will also benefit from the present inventions.

An antenna 36 extends from the sensor 24. As generally known, the sensor assembly include circuitry and a power source to provide a measurement and transmit the measurement to a remote receiver. The antenna 36 is preferably mounted along the length 30 of the band 28. Alternatively or in addition, the antenna maybe embedded directly into the band 28. As the band 28 is preferably non-metallic, the band 28 is essentially transparent to RF signal or the like transmitted and/or received from the antenna 36. Moreover, as the antenna can extend for a length approximately equal to the rim inner diameter 16 (FIG. 1A) heretofore transmission/reception problems are essentially eliminated.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle tire sensor assembly comprising:
    a band having a length to extend about an inner diameter of a vehicle wheel rim;
    a sensor mounted along said band;
    a counterweight mounted along said band away from said sensor, wherein said counterweight comprises a power source that powers said sensor 2. The vehicle tire sensor assembly as recited in claim 1, wherein said sensor and said counterweight are mounted along said band to locate said sensor 180 degrees opposite said counterweight about said inner diameter.

3. The vehicle tire sensor assembly as recited in claim 1, further comprising an antenna in communication with said sensor, said antenna extended at least partially along said length of said band.

4. The vehicle tire sensor assembly as recited in claim 3, wherein said antenna is embedded within said band.

5. The vehicle tire sensor assembly as recited in claim 1, wherein said band is non-metallic.

6. The vehicle tire sensor assembly as recited in claim 1, wherein a first end of said band engages an opposite end of said band.

7. The vehicle tire sensor assembly as recited in claim 1, wherein said sensor comprises a pressure sensor.

8. The vehicle tire sensor assembly as recited in claim 1, further comprising an antenna in communication with said sensor, said antenna embedded within said band between said sensor and said power source.

9. The vehicle fire sensor assembly as recited in claim 1, wherein a first end of said band comprises a male end which passes through a female end opposite said male end of said band.

10. The vehicle tire assembly of claim 1, wherein a first end of said band comprises a male end which passes through a female end opposite said male end of said band.

11. A vehicle wheel assembly comprising:
    a vehicle wheel rim having an inner diameter;
    a band having a length to extend about said inner diameter;
    a pressure sensor mounted along said band;
    a counterweight mounted along said band spaced away from said sensor;
    a power source contained within said counterweight.

12. The vehicle wheel rim assembly as recited in claim 11, wherein said pressure sensor and said counterweight are mounted along said band to locate said pressure sensor 180 degrees opposite said counterweight about said inner diameter.

13. The vehicle wheel rim assembly as recited in claim 11, further comprising an antenna in communication with said pressure sensor, said antenna extended at least partially along said length of said band.

14. The vehicle wheel rim assembly as recited in claim 13, wherein said antenna is embedded within said band.

15. The vehicle wheel rim assembly as recited in claim 11, wherein a first end of said band engages an opposite end of said band.

16. The vehicle tire sensor assembly as recited in claim 11, further comprising an antenna in communication with said sensor, said antenna embedded within said band between said sensor and said power source.

17. The vehicle tire sensor assembly as recited in claim 11, wherein a first end of said band comprises a male end which passes through a female end opposite said male end of said band.

18. The vehicle tire sensor assembly as recited in claim 11, wherein said band is non-metallic.

19. A vehicle tire sensor assembly comprising:
    a non-metallic band having a length to extend about an inner diameter of a vehicle wheel rim;
    a sensor mounted along said band;
    an antenna in communication with said sensor and embedded within said non-metallic band; and
    a counterweight mounted along said band spaced away from said sensor, wherein said counterweight comprises a power source that powers said sensor.

* * * * *